(12) United States Patent
Bowen et al.

(10) Patent No.: US 6,668,961 B2
(45) Date of Patent: *Dec. 30, 2003

(54) FULL-TIME ALL-WHEEL DRIVE POWER TAKE-OFF UNIT FOR MOTOR VEHICLE

(75) Inventors: Thomas C. Bowen, Rochester Hills, MI (US); Fred C. Porter, Beverly Hills, MI (US)

(73) Assignee: New Venture Gear, Inc., Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/313,522

(22) Filed: Dec. 6, 2002

(65) Prior Publication Data

US 2003/0085068 A1 May 8, 2003

Related U.S. Application Data

(63) Continuation of application No. 10/023,306, filed on Dec. 17, 2001, now Pat. No. 6,513,615.
(60) Provisional application No. 60/278,901, filed on Mar. 26, 2001.

(51) Int. Cl.$^7$ ............................................. B60K 17/348
(52) U.S. Cl. ....................................... 180/248; 475/225
(58) Field of Search ................................. 180/248, 249, 180/250, 233, 247; 475/221, 225, 222, 248, 249, 252

(56) References Cited

U.S. PATENT DOCUMENTS

| | | | |
|---|---|---|---|
| 3,768,336 A | 10/1973 | Wharton | |
| 4,031,780 A | 6/1977 | Dolan et al. | |
| 4,041,804 A | 8/1977 | Clark | |
| 4,457,394 A | * 7/1984 | Suzuki | 180/247 |
| 4,589,304 A | 5/1986 | Ashikawa et al. | |
| 4,817,753 A | * 4/1989 | Hiketa | 180/249 |
| 4,840,247 A | 6/1989 | Kashihara et al. | |
| 4,862,769 A | * 9/1989 | Koga et al. | 475/86 |
| 4,866,624 A | 9/1989 | Nishikawa et al. | |
| 4,867,262 A | * 9/1989 | Takada et al. | 180/249 |
| 4,873,892 A | 10/1989 | Ohkubo | |
| 4,895,236 A | 1/1990 | Sakakibara et al. | |
| 4,950,214 A | 8/1990 | Botterill | |
| 4,969,532 A | 11/1990 | Oyama et al. | |
| 4,974,696 A | * 12/1990 | Miyajima et al. | 180/248 |
| 5,071,396 A | * 12/1991 | Kobayashi | 475/249 |
| 5,086,867 A | 2/1992 | Hirota et al. | |
| 5,366,419 A | 11/1994 | Oda | |
| 5,411,447 A | 5/1995 | Frost | |
| 5,415,598 A | 5/1995 | Sawase et al. | |
| 5,904,632 A | 5/1999 | Brown et al. | |
| 5,910,064 A | 6/1999 | Kuroki | |
| 6,076,623 A | 6/2000 | Teraoka et al. | |
| 6,142,905 A | 11/2000 | Brown et al. | |
| 6,158,303 A | 12/2000 | Shiraishi et al. | |
| 6,513,615 B2 | * 2/2003 | Bowen et al. | 180/248 |

* cited by examiner

Primary Examiner—Anne Marie Boehler
(74) Attorney, Agent, or Firm—Harness, Dickey & Pierce, P.L.C.

(57) ABSTRACT

A full-time all-wheel drive system for a motor vehicle equipped with a transversely mounted engine and transaxle includes a power take-off unit. The power take-off unit includes an interaxle differential which drives a first power path connected to the front wheels and a second power path connected to the rear wheels. The first power path includes a planetary final drive unit which drives a double planetary front differential unit that is interconnected to a pair of front axleshafts. The second power path includes a helical gearset and a bevel gearset which deliver power to a rear propshaft.

19 Claims, 8 Drawing Sheets

FULL-TIME ALL-WHEEL DRIVE POWER TAKE-OFF UNIT FOR MOTOR VEHICLE

CROSS-REFERENCE TO RELATED APPLICATIONS

This application is a continuation of U.S. Ser. No. 10/023,306 filed, Dec. 17, 2001 now U.S. Pat. No. 6,513,615 which claims the benefit of U.S. Provisional Application No. 60/278,901, filed Mar. 26, 2001.

FIELD OF THE INVENTION

The present invention relates generally to all-wheel drive motor vehicles, and more particularly, to a power take-off unit providing full-time four-wheel drive to the front and rear drivelines.

BACKGROUND OF THE INVENTION

In recent years, there has been a significant increase in the demand for motor vehicles equipped with a powertrain capable of providing drive torque to all four wheels. Traditional four-wheel drive vehicles are equipped with a longitudinally-extending engine and transmission that deliver power to the input of a transfer case which, in turn, distributes the power to the front and rear drivelines. As is known, some transfer cases are equipped with a transfer clutch for automatically transferring power to the front driveline during lost traction situations to establish an "on-demand" four-wheel drive mode. Other transfer cases are equipped with an interaxle differential which functions to transmit power to both drivelines during normal conditions at a predetermined torque distribution ratio so as to establish a full-time four-wheel drive mode. Such four-wheel drive vehicles are typically based on a rear wheel drive arrangement and, as such, are generally limited to SUV's and trucks.

To provide drive torque to the rear wheels in front wheel drive vehicles, a power take-off unit (PTU) is driven by the output of a front-wheel drive transaxle and supplies power to the rear driveline. Typically, such an all-wheel drive arrangement delivers torque automatically (i.e., on-demand) through a transfer clutch to the rear driveline upon lost traction at the front wheels. Recently, a great deal of development effort has been directed at packaging the PTU and the remaining rear driveline components within the underbody of conventional front-wheel drive vehicles. Thus, a need exists to develop new AWD powertrain arrangements which are compact in size, can be packaged into existing front-wheel drive vehicles, and provide features (i.e., full-time AWD, automatic torque biasing) that enhance performance.

SUMMARY OF THE INVENTION

It is therefore an object of the present invention to provide an all-wheel drive system for a motor vehicle equipped with a transversely mounted engine and transmission assembly.

As a related object, the all-wheel drive system includes a power take-off unit having an interaxle differential which drives a first power path connected to the front wheels and a second power path connected to the rear wheels. The first power path includes a planetary final drive unit which drives a double planetary front differential unit that is interconnected to a pair of front axleshafts. The second power path includes a helical gearset and a bevel gearset which deliver power to a rear propshaft.

As further object, the PTU of the present invention may include an electronically-controlled biasing clutch assembly operable to control interaxle speed differentiation and torque-biasing.

These and other objects, advantages and features of the present invention will the art from studying the following detailed description and the drawings which, while disclosing the invention in the best mode currently known for carrying out the invention, are not intended to be limiting but rather exemplary of one application currently contemplated.

DETAILED DESCRIPTION OF THE PREFERRED EMBODIMENTS

The present invention is directed to a power take-off unit for use in an all-wheel drive vehicle equipped with a transversely mounted engine and transmission and which is arranged to provide a full-time four-wheel drive mode of operation. The right-angled design provides a compact package which permits use of the power take-off unit in a wide variety of all-wheel drive vehicles.

Figure 1:
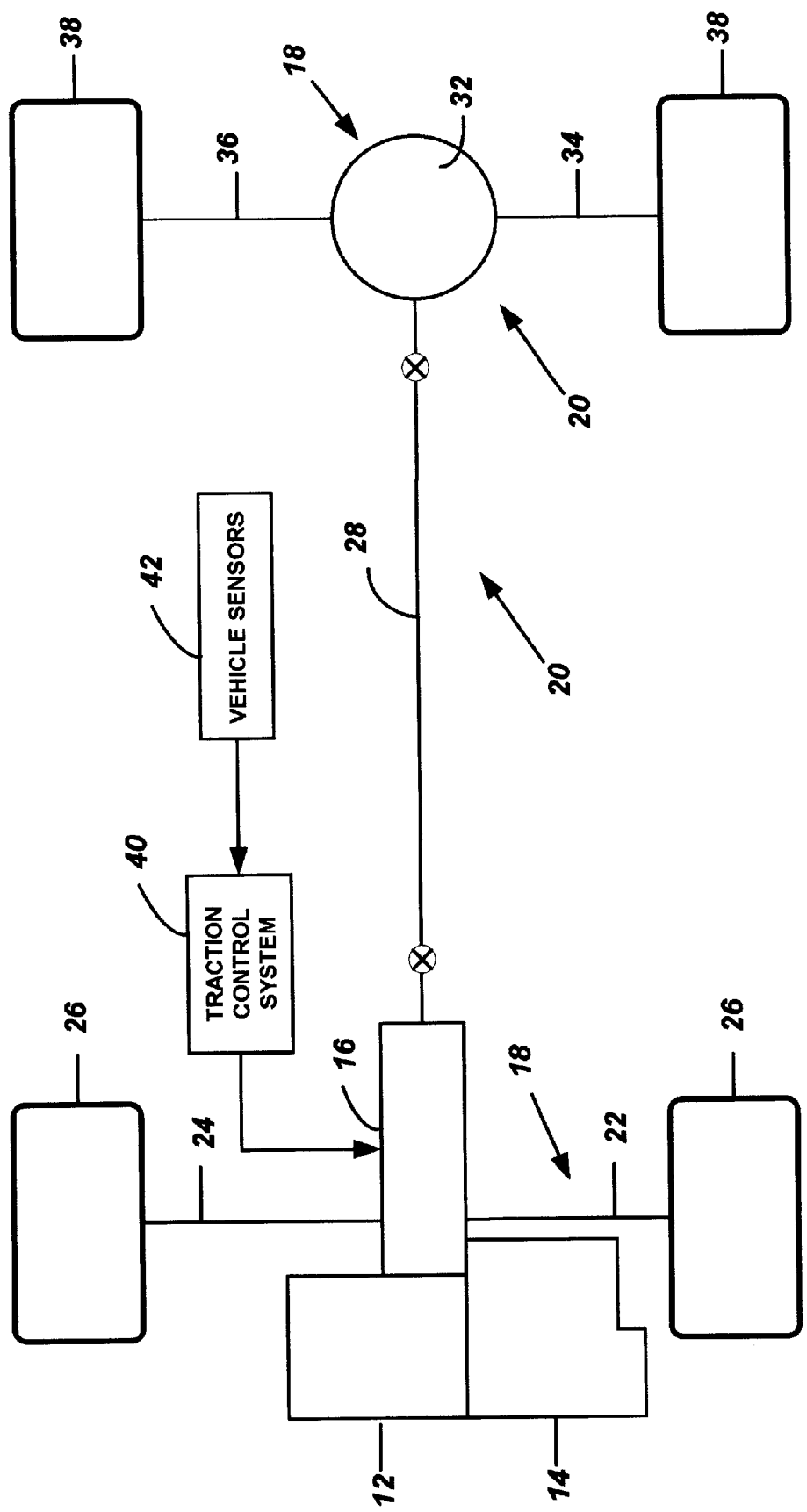
FIG. 1 is a schematic view of an all-wheel drive vehicle equipped with the full-time power take-off unit of the present invention.

Referring to FIG. 1, a schematic illustration of an all-wheel drive motor vehicle 10 is shown to include a transversely mounted engine 12 and transmission 14 adapted to deliver motive power (i.e., drive torque) to the input of a power take-off unit (PTU) 16. PTU 16 is adapted for use in a full-time all-wheel drive system and is operable to transfer drive torque at a predetermined distribution ratio to a front driveline 18 and a rear driveline 20. Front driveline 18 includes a pair of axleshafts 22 and 24 connected to a pair of ground-engaging wheels 26. Rear driveline 20 includes a drive shaft 28 and a rear axle assembly 30. One end of driveshaft 28 is connected to an output member of PTU 16 and its opposite end is connected to a differential 32 associated with rear axle assembly 30. Axle assembly 30 further includes a pair of axleshafts 34 and 36 which connect a pair of ground-engaging wheels 38 to differential 32. PTU 16 can be equipped with a torque biasing and slip limiting clutch assembly that is controlled by a traction control system 40 based on vehicle operating conditions, as detected by various vehicle sensors 42.

Referring primarily to FIGS. 2 through 7, the structure and function of the components associated with PTU 16 will now be described. In general, PTU 16 includes an input shaft 44, an interaxle differential 46, a front drive assembly 48, a rear drive assembly 50, and a torque biasing clutch assembly 52. Interaxle differential 46 is a compound planetary gearset having a planet carrier 54 fixed via a spline connection 56 to input shaft 44, a first sun gear 58, a set of first planet gears 60 rotatably supported by planet carrier 54 and meshed with first sun gear 58, a second sun gear 62, and a set of second planet gears 64 rotatably supported by planet carrier 54 and meshed with second sun gear 62. Each of first planet gears 60 is journalled on a pinion shaft 66 extending between a front carrier ring 68 and a rear carrier ring 70. Similarly, each of second planet gears 64 is journalled on a pinion shaft 72 extending between carrier rings 68 and 70. Meshed pairs of first planet gears 60 and second planet gears 64 are circumferentially arranged and equally-spaced on planet carrier 54 so as to establish a predetermined front/rear torque split and permit speed differentiation between first sun gear 58 and second sun gear 62. Preferably, about 60% of the torque transferred through interaxle differential 46 is delivered to front drive assembly 48 via first sun gear 58 while the remaining 40% of he drive torque is delivered to rear drive assembly 50 via second sun gear 62. Those skilled in the art will understand that this 60/40 torque distribution ratio can be modified to meet the requirements of each particular vehicular application.

As noted, drive torque is delivered to front drive assembly 48 from first sun gear 58. Front drive assembly 48 includes a final drive unit 74 and a differential unit 76. Final drive unit 74 is a simple planetary gearset having a sun gear 78, a ring gear 80, and a set of pinion gear 82 meshed with sun gear 78 and ring gear 80. Ring gear 80 is non-rotatably secured to housing 84 while each pinion gear 82 is rotatably supported by a bearing assembly 86 on a post 88 extending between front and rear carrier plates 90 and 92, respectively, of a pinion carrier 94. Sun gear 78 is shown to be integrally formed on one end of a tubular transfer shaft 96, the opposite end of which is fixed via a spline connection 98 to first sun gear 58 of interaxle differential 46. Transfer shaft 96 is shown to be supported on a front axleshaft 22 for rotation relative thereto. Thus, driven rotation of transfer shaft 96 causes pinion carrier 94 to be driven at a reduced speed ratio. In the particular arrangement shown, sun gear 78 has 42 teeth, ring gear 80 has 114 teeth, and pinion gears 82 have 36 teeth for establishing a reduction ration of 3.714 to 1.0. As will be appreciated, the reduction ratio can be modified to provide the desired speed reduction for the final drive unit 74.

Differential unit 76 is a dual planetary gearset driven by pinion carrier 94 and having a pair of outputs which are interconnected to axleshafts 22 and 24. Specifically, differential unit 76 includes an input ring gear 98 fixed for rotation with pinion carrier 94, an output sun gear 100 fixed via a spline connection 102 to axleshaft 22 and, an output carrier 104 fixed via a spline connection 106 to axleshaft 24. Differential unit 76 further includes, a set of first pinions 108 meshed with input ring gear 98, and a set of second pinions 110 meshed with output sun gear 100. First pinions 108 are journalled on pinion shafts 112 while second pinions 110 are journalled on pinion shafts 114. First pinions 108 and second pinions 110 are arranged in meshed pairs Thus, differential unit 76 establishes a determined torque distribution ratio between front axleshafts 22 and 24. In this particular arrangement, ring gear 98 has 72 teeth, sun gear 100 has 36 teeth, first pinions 108 have 16 teeth and second pinions 110 have 16 teeth so as to establish a 50/50 front left-to-right torque split and permit speed differentiation between axleshafts 22 and 24.

Figure 2:
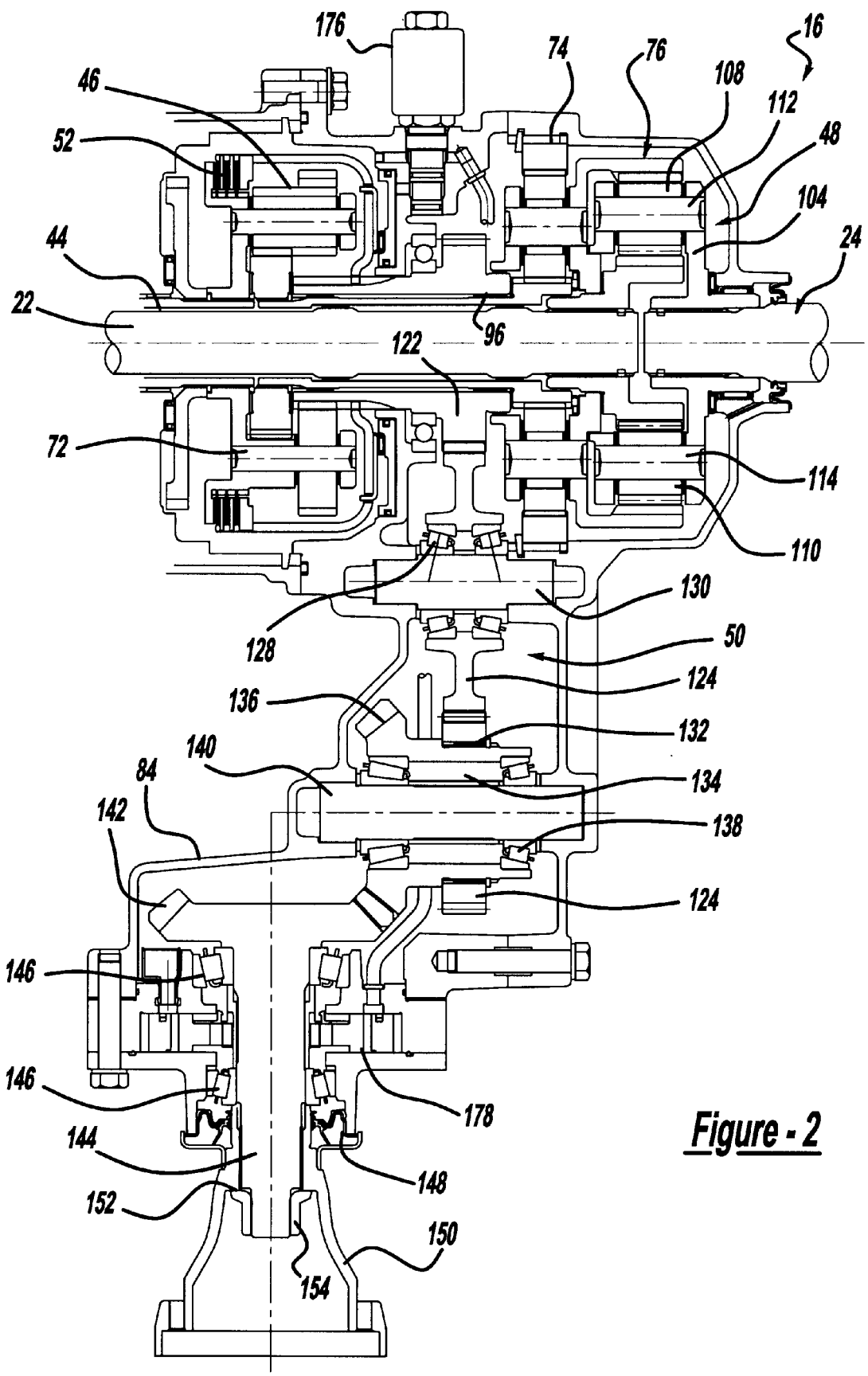
FIG. 2 is a sectional view of the full-time power take-off unit of the present invention.
Figure 3:
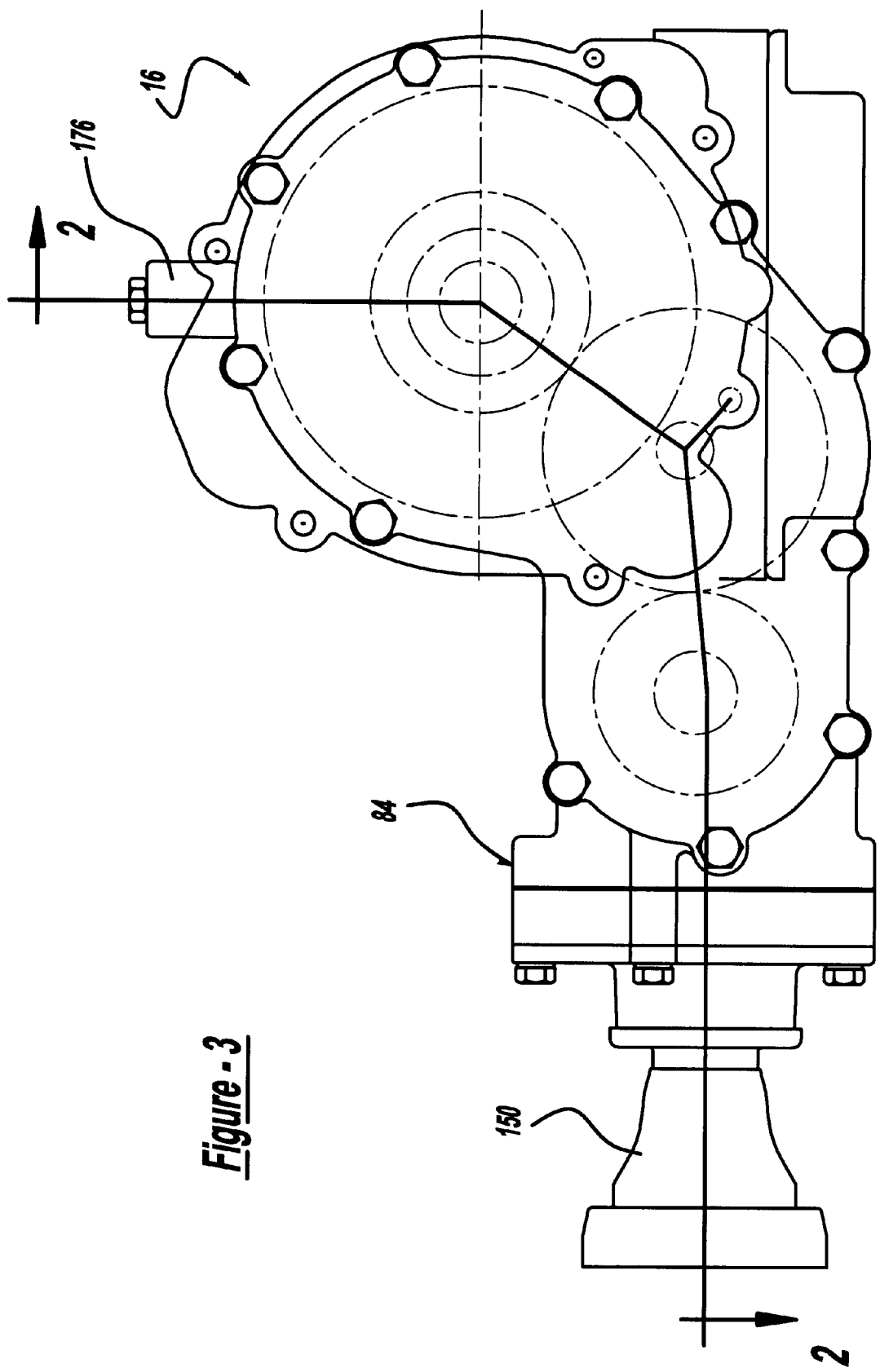
FIG. 3 is an end view of the power take-off unit showing section line A—A along which the sectional view of FIG. 2 was taken.
Figure 4:
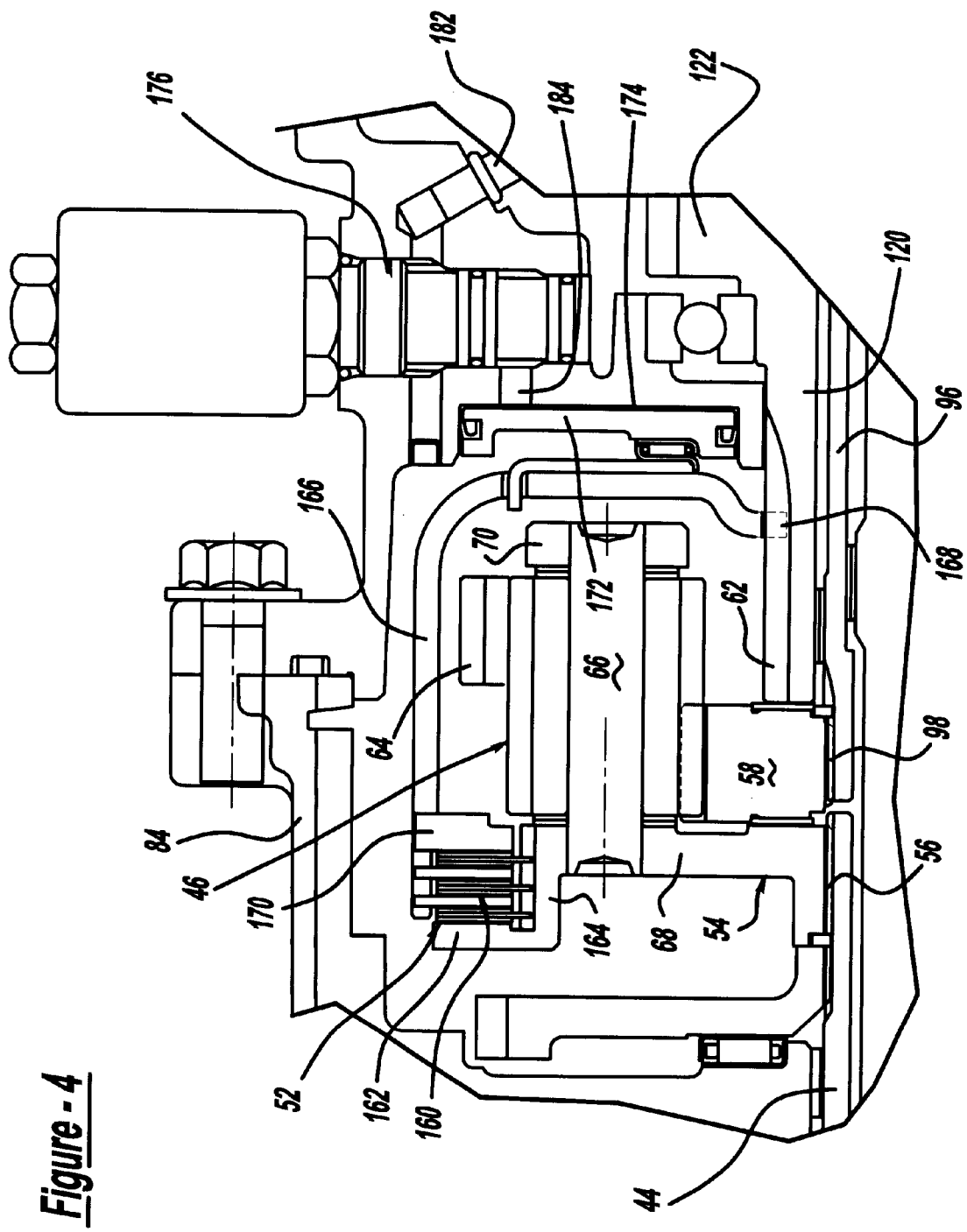
FIG. 4 is an enlarged partial view taken from FIG. 2 showing the components associated with the interaxle differential and biasing clutch in greater detail.
Figure 5:
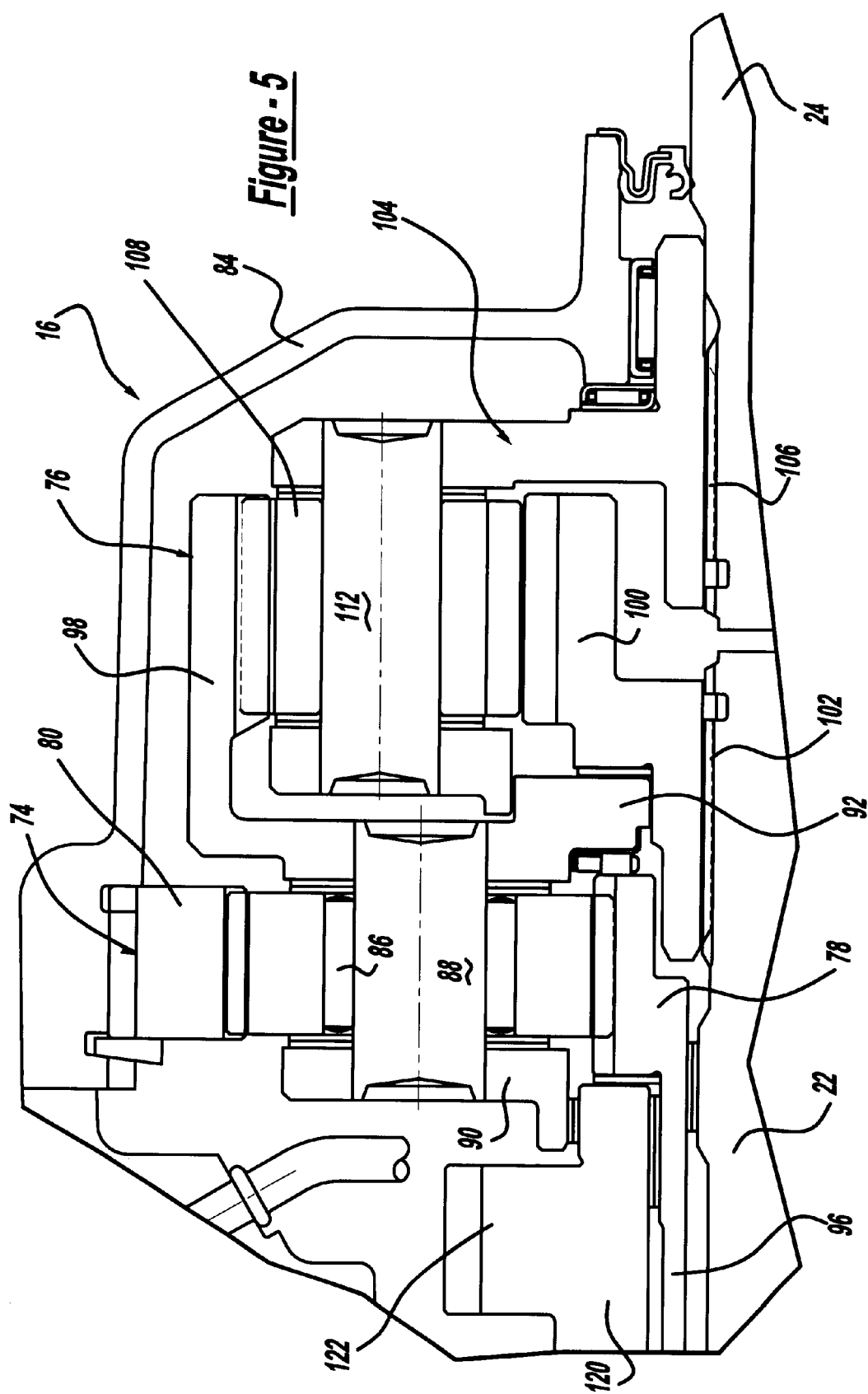
FIG. 5 is an enlarged partial view taken from FIG. 2 showing the components of the front final drive unit and front differential.
Figure 6:
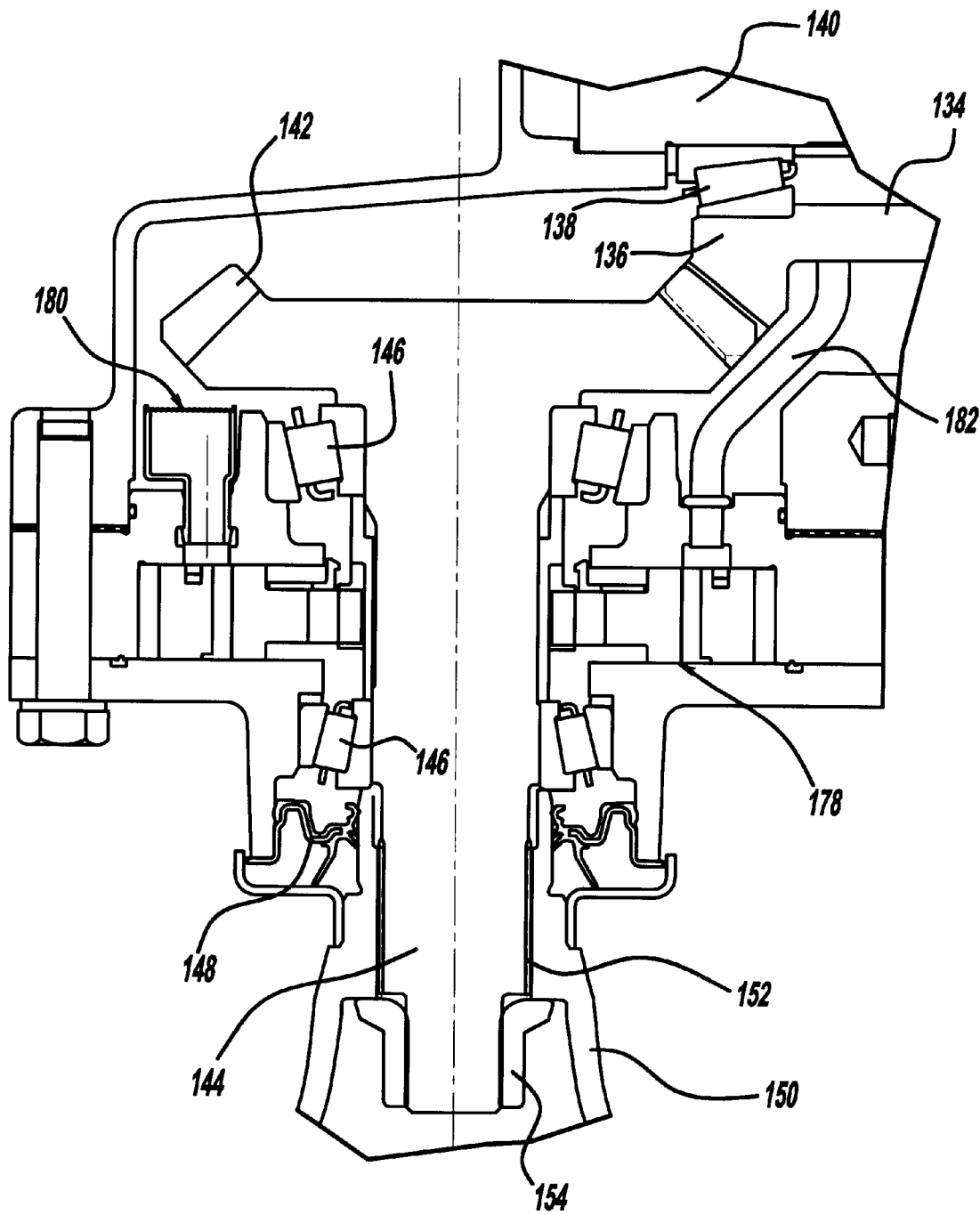
FIG. 6 is an enlarged partial view taken from FIG. 2 showing components associated with the bevel gearset and hydraulic fluid control system.
Figure 7:
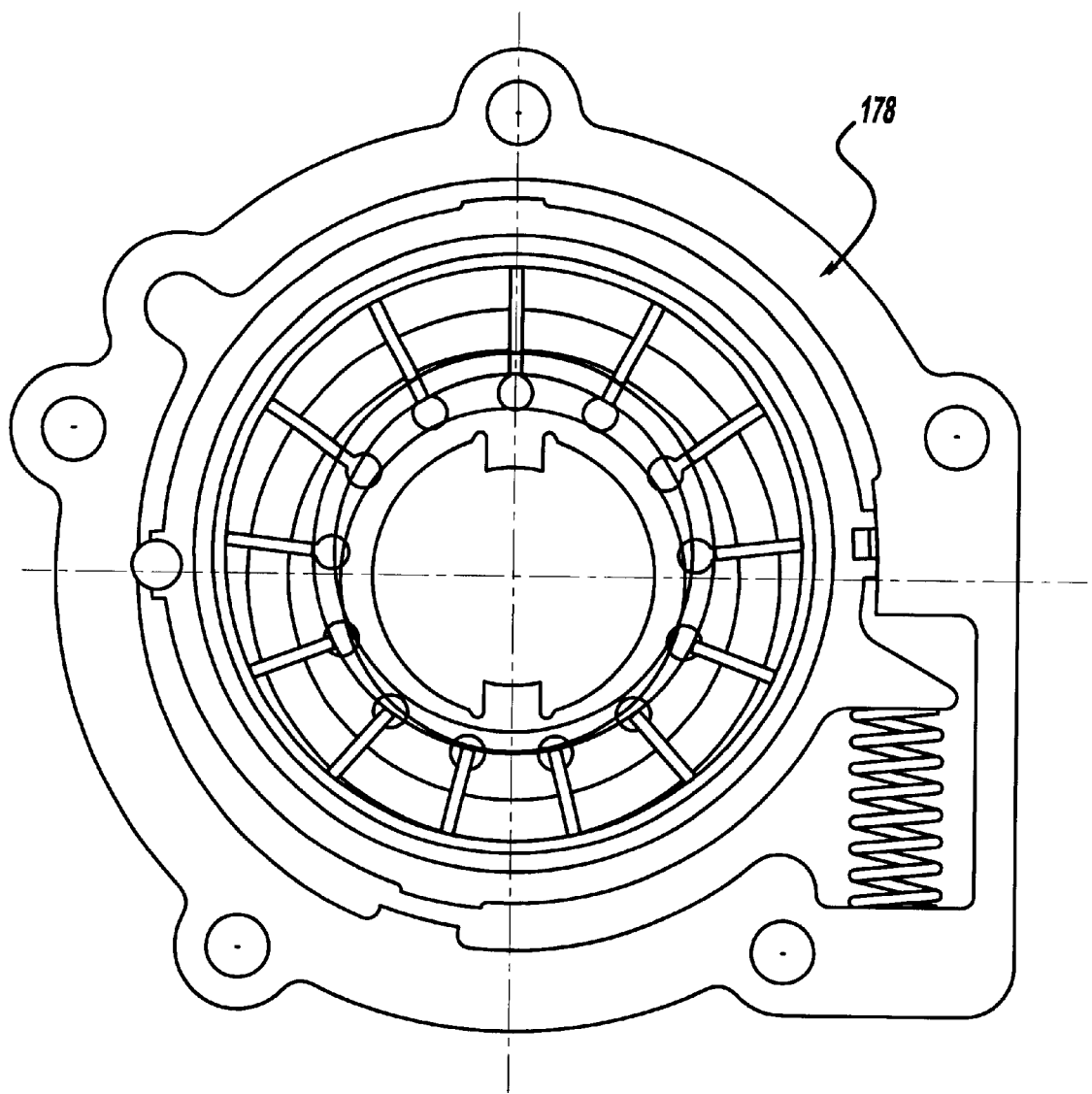
FIG. 7 shows the vane-type variable displacement pump installed in the power take-off unit.

Referring now primarily to FIGS. 2 and 6, rear drive assembly 50 is shown to include a second transfer shaft 120 that is rotatably supported on first transfer shaft 96. Second sun gear 62 is formed at one end of second transfer shaft 120 while a first transfer gear 122 is formed at its opposite end. First transfer gear 122 is part of a three gear helical gearset further including a second transfer gear 124 and a third transfer gear 126 that is meshed with both first transfer gear 122 and second transfer gear 124. Third transfer gear 126 is shown to be rotatably supported by bearing assemblies 128 on an idler shaft 130. Second transfer gear 126 is fixed via a spline connection 132 to a tubular hub segment 134 of a first bevel gear 136. Hub segment 134 of first bevel gear 136 is rotatably supported by a pair of laterally-spaced bearing assemblies 138 on a rail 140 that is secured to housing 84.

First bevel gear 136 is part of a two component bevel gearset also including a second bevel gear 142 that is meshed with first bevel gear 136 and is formed at one end of an output shaft 144. Output shaft 144 is supported for rotation relative to housing 84 by a pair of laterally-spaced bearing assemblies 146 and is sealed relative thereto via a resilient lipseal assembly 148. A yoke 150 is fixed via a spline connection 152 to the opposite end of output shaft 144 and is retained thereon within a lock nut 154.

Clutch assembly 52 is a hydraulically-actuated multiplate clutch including a clutch pack 160 operably disposed between planet carrier 54 and second sun gear 62 of interaxle differential 46. In particular, clutch pack 160 also includes a set of inner clutch plates that are splined to a hub segment 164 of front carrier ring 68. Clutch pack 160 also includes a set of outer clutch plates that are splined to a clutch drum 166 fixed via a spline connection 168 to second transfer shaft 120. Clutch pack 160 is located between a reaction ring 162 formed on front carrier ring 68 and an apply plate 170. Apply plate 170 is also fixed for rotation with clutch drum 166 and is axially moveable relative to clutch pack 160 for exerting a compressive clutch engagement force so as to limit speed differentiation between planet carrier 54 and second transfer shaft 120.

Traction control system 40 is operable to control adaptive actuation of clutch assembly 52 and is shown to include an electro-hydraulic clutch actuation system. The clutch actuation system includes a piston 172 mounted in a piston chamber 174 formed in housing 84, a control valve 176 operable to control fluid flow into and out of piston chamber 174, and a pump 178 operable to supply high pressure fluid to an inlet of control valve 176. Fluid entrained in an internal sump located within housing 84 is drawn through a pump screen 180 into an inlet of pump 178. Pump 178 is shown as a variable displacement vane pump that is operable to generate a fluid pumping action in response to rotation of output shaft 144. High pressure fluid is discharged from pump 178 and is supplied via a supply line 182 to the inlet of control valve 176. Control valve 176 is an electro-hydraulic valve, such as a variable force solenoid valve, and has a control pressure outlet in fluid communication with piston chamber 174 via a flow passage 184 and an exhaust pressure outlet in fluid communication with the sump via an exhaust passage (not shown).

Based on a predetermined control strategy, the fluid pressure in piston chamber 174 is controlled to regulate axial movement of piston 172 which, in turn, axially moves clutch drum 166. Such axial movement of clutch drum 166 results in corresponding axial movement of apply plate 176. In this manner, the torque bias and speed differentiation across interaxle differential 46 can be variably controlled by adaptively regulating the clutch engagement force exerted by piston 172 on clutch pack 160. Preferably, traction control system 40 includes an electric controller adapted to receive input signals from the vehicle sensors 42 and regulate control of control valve 176 in response thereto. One example of a possible control strategies to be employed by control system 40 is shown and described in commonly-owned U.S. Pat. No. 6,071,207. In particular, the '207 patent discloses the strategy for actively controlling interaxle slip based on vehicle speed and the front-rear speed differential. Thus, it will be understood that hydraulic clutch actuation system disclosed could easily be replaced by a mechanically-actuated arrangement (see U.S. Pat. No.

5,400,866), an electromagnetic system, or any other clutch actuation system currently used or known in the power transmission art. As a further option, the electronically-controlled clutch system could be replaced with a passive system (i.e., viscous coupling, hydraulic coupling, geared traction couplings, etc.) which only is activated in response to excessive speed differentiation across interaxle differential 46.

Figure 8:
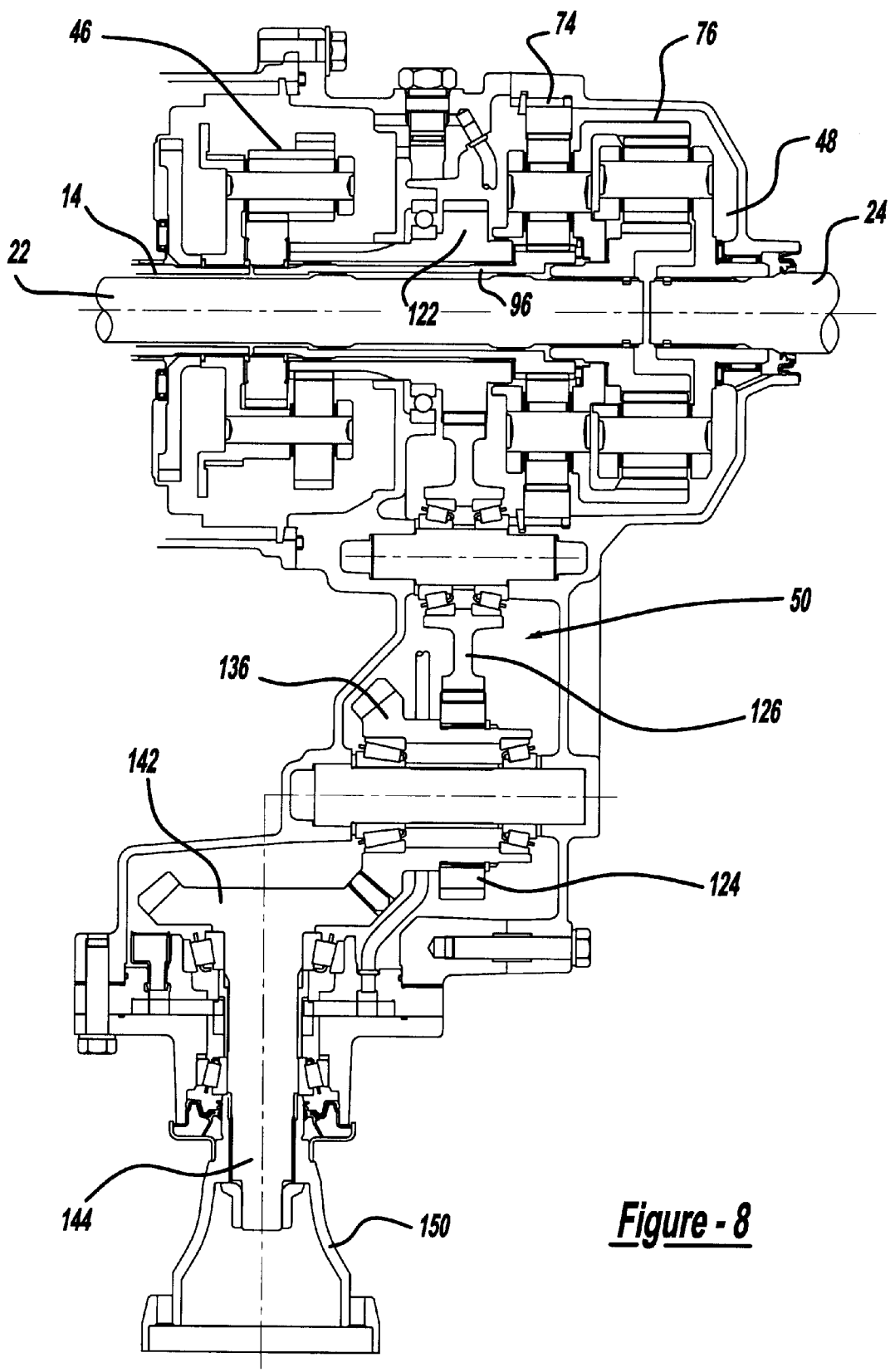
FIG. 8 is a sectional of an alternative construction for the power take-off unit of the present invention.

Finally, FIG. 8 illustrates PTU 16 with clutch assembly 52 removed such that interaxle differential 46 acts as an open center differential.

A preferred embodiment of the invention has been disclosed to provide those skilled in the art an understanding of the best mode currently contemplated for the operation and construction of the four-wheel drive hybrid drive system. The invention being thus described, it will be obvious that various modifications can be made without departing from the true spirit and scope of the invention, and all such modifications as would be considered by those skilled in the art are intended to be included within the scope of the following claims.

What is claimed is:

1. A power transfer unit for a motor vehicle having a powertrain and first and second drivelines, comprising:

an input shaft adapted to be driven by the powertrain;

an interaxle differential having an input component driven by said input shaft and first and second output components;

a front drive assembly including a reduction gearset and a differential gearset, said reduction gearset including an input driven by said first output component of said interaxle differential and an output driven at a reduced speed, said differential gearset includes an input driven by said output of said reduction gearset and first and second outputs respectively driving first and second axleshafts of the first driveline, wherein said reduction gearset is a planetary gearset having a sun gear as its input, a fixed ring gear, a carrier as its output, and pinion gears rotatably supported by said carrier and meshed with said sun gear and ring gear, and said differential gearset is a planetary gearset having a ring gear as its input that is driven by said carrier of said reduction gearset, a pinion carrier as its first output, a sun gear as its second output, and pinion gears rotatably supported from said pinion carrier that mesh with said ring gear and said sun gear;

a rear drive assembly including an input driven by said second output component of said interaxle differential, an output adapted to drive the second driveline, and a right-angled gearset interconnecting said input to said output;

a biasing clutch operably disposed between any two components of said interaxle differential;

a clutch actuator for engaging said biasing clutch; and a traction control system for controlling actuation of said clutch actuator.

2. The power transfer unit of claim 1 wherein said biasing clutch is a multi-plate clutch assembly including a clutch pack operably disposed between said input component and one of said first and second output components of said interaxle differential, and wherein said clutch actuator is operable to exert a compressive clutch engagement force on said clutch pack in response to control signals from said traction control system.

3. The power transfer unit of claim 1 wherein said interaxle differential is a planetary gearset having a carrier as its input component, a first sun gear as its first output component, a second sun gear as its second output component, and planet gears rotatably supported by said carrier and meshed with said first and second sun gears.

4. The power transfer unit of claim 1 wherein said rear drive assembly includes a transfer assembly and a bevel gearset, said transfer assembly includes a first transfer gear driven by said second output component of said interaxle differential, a second transfer gear, and a transfer unit for transmitting drive torque from said first transfer gear to said second transfer gear, and wherein said bevel gearset is driven by said second transfer gear.

5. A motor vehicle comprising:

a powertrain including an engine and a transmission;

a pair of front wheels interconnected to a pair of front axleshafts;

a rear driveline including a rear differential having an input connected to a first end of a propshaft, and first and second outputs connected to a pair of rear wheels;

a power transfer unit having an input shaft driven by said powertrain, an interaxle differential having an input component driven by said input shaft and first and second output components, a front drive assembly including a reduction gearset and a differential gearset, said reduction gearset including a sun gear driven by said first output component of said interaxle differential, a fixed ring gear, a carrier driven at a reduced speed, and planet gears supported by said carrier and meshed with said sun gear and said ring gear, said differential gearset includes a ring gear driven by said carrier of said reduction gearset, a pinion carrier driving one of said front axleshafts, a sun gear driving the other of said front axleshafts, and pinions supported from said pinion carrier that mesh with at least one of said sun gear and said ring gear, a rear drive assembly including an input driven by said second output component of said interaxle differential, an output operably connected to a second end of said propshaft, and a right-angled gearset interconnecting said input to said output, a biasing clutch operably disposed between two components of said interaxle differential, a clutch actuator for engaging said biasing clutch, and a traction control system for controlling actuation of said clutch actuator.

6. The power transfer unit of claim 5 wherein said biasing clutch is a multi-plate clutch assembly including a clutch pack operably disposed between said input component and one of said first and second output components of said interaxle differential, and wherein said clutch actuator is operable to exert a compressive clutch engagement force on said clutch pack in response to control signals from said traction control system.

7. The power transfer unit of claim 5 wherein said interaxle differential is a planetary gearset having a carrier as its input component, a first sun gear as its first output component, a second sun gear as its second output component, and planet gears rotatably supported by said carrier and meshed with said first and second sun gears.

8. The power transfer unit of claim 5 wherein said right-angled gearset of said rear drive assembly includes a transfer assembly and a bevel gearset, said transfer assembly includes a first transfer gear driven by said second output component of said interaxle differential, a second transfer gear, and a transfer unit for transmitting drive torque from said first transfer gear to said second transfer gear, and wherein said bevel gearset is driven by said second transfer gear.

9. A power transfer unit for a four-wheel drive vehicle having a powertrain and front and rear drivelines, comprising:

an input shaft adapted to be driven by the powertrain;

an interaxle differential having a first sun gear as a first output, a second sun gear as a second output, a first carrier as an input that is driven by said input shaft, a set of first planet gears rotatably supported by said first carrier and meshed with said first sun gear, and a set of second planet gears rotatably supported by said first carrier and meshed with said second sun gear and said first planet gears;

a final drive unit having a third sun gear driven by said first sun gear, a first ring gear fixed to a stationary member, and a set of first pinion gears meshed with said first ring gear and said third sun gear and which are rotatably supported from a second carrier;

a differential unit having a second ring gear driven by said second carrier, a fourth sun gear fixed to one of a pair of front axleshafts associated with the front driveline, a third carrier fixed to the other of said pair of front axleshafts, a set of second pinion gears rotatably supported from said third carrier and meshed with said second ring gear, and a set of third pinion gears rotatably supported from said third carrier and meshed with said fourth sun gear and said second pinion gears;

a rear drive assembly having an input driven by said second sun gear, an output adapted for connection to the rear driveline, and a right-angled gearset interconnecting said input to said output;

a biasing clutch operably disposed between said input and one of said first and second outputs of said interaxle differential;

a clutch actuator for engaging said biasing clutch; and a traction control system for controlling actuation of said clutch actuator.

10. The power transfer unit of claim 9 wherein said biasing clutch is a multi-plate clutch assembly including a clutch pack operably disposed between said input and one of said first and second outputs of said interaxle differential, and wherein said clutch actuator is operable to exert a compressive clutch engagement force on said clutch pack in response to control signals from said traction control system.

11. The power transfer unit of claim 9 wherein said right-angled gearset of said rear drive assembly includes a transfer assembly and a bevel gearset, said transfer assembly includes a first transfer gear driven by said second output of said interaxle differential, a second transfer gear, and a transfer unit for transmitting drive torque from said first transfer gear to said second transfer gear, and wherein said bevel gearset is driven by said second transfer gear.

12. The power transfer unit of claim 9 wherein said clutch actuator includes a piston supported for movement in a piston chamber, a control valve operable to control fluid flow into and out of said piston chamber, and a pump for supplying high pressure fluid to said control valve, and wherein said traction control system has an electric controller operable to receive input signals from vehicle sensors, said controller operable to send electric control signals to said control valve in response said input signals.

13. The power transfer unit of claim 12 wherein said pump is a variable displacement pump that generates a fluid pumping action in response to rotation of said output of said rear drive assembly, and wherein said control valve is an electro-hydraulic valve.

14. A power transfer unit for a four-wheel drive vehicle having a powertrain and sets of first and second wheels, comprising:

an input shaft adapted to be driven by the powertrain;

a first planetary gearset having an input driven by said input shaft, and first and second outputs, wherein said input of said first planetary gearset is a first carrier, said first output is a first sun gear, and said second output is a second sun gear;

a second planetary gearset having an input driven by said first output of said first planetary gearset and an output driven at a reduced speed;

a third planetary gearset having an input driven by said output of said second planetary gearset, a first output driving a first axleshaft and a second output driving a second axleshaft, said first and second axleshafts driving the set of first wheels; and a transfer assembly having an input driven by said second output of said first planetary gearset, an output operably connected to the pair of second wheels, and a transfer unit for transmitting rotary power from said input to said output.

15. The power transfer unit of claim 14 wherein said transfer unit includes a bevel gearset.

16. The power transfer unit of claim 14 further comprising:

a biasing clutch operably disposed between any two of said first carrier and said first and second sun gears;

a clutch actuator for engaging said biasing clutch; and a traction control system for controlling actuation of said clutch actuator.

17. The power transfer unit of said claim 16 wherein said biasing clutch is a multi-plate clutch assembly including a clutch pack operably disposed between said first carrier and one of said first and second sun gears, and wherein said clutch actuator is operable to exert a compressive clutch engagement force on said clutch pack in response to control signals from said traction control system.

18. A power transfer unit, comprising:

an input shaft;

an interaxle differential having an input carrier driven by said input shaft, a first output sun gear, a second output sun gear, and gear means for transferring drive power from said input carrier to said first and second output sun gears;

a final drive assembly having an input sun gear driven by said first output sun gear, a fixed ring gear, an output carrier, and pinion gears supported on said output carrier and meshed with said fixed ring gear and said input sun gear;

a differential unit having an input driven by said output carrier, a first output driving a first axleshaft, a second output driving a second axleshaft, and second gear means for transferring drive power from said input to said first and second outputs;

a bevel gearset; and transfer means for transferring drive power from said second output sun gear to said bevel gearset.

19. The power transfer unit of claim 18 further comprising:

a biasing clutch operably disposed between any two of said input carrier and said first and second output sun gears of said interaxle differential;

a clutch actuator for engaging said biasing clutch; and a traction control system for controlling actuation of said clutch actuator.

\* \* \* \* \*